April 18, 1950     D. S. DE MUNCK     2,504,186
CHUCK
Filed Nov. 28, 1945
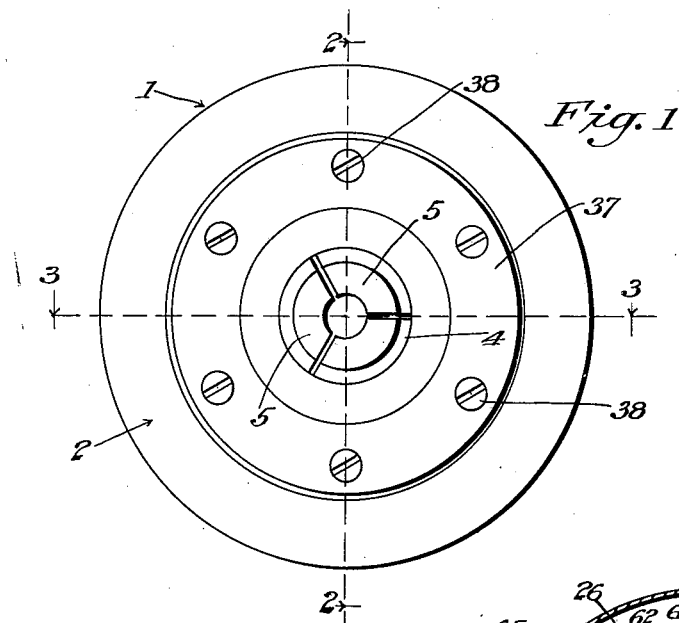
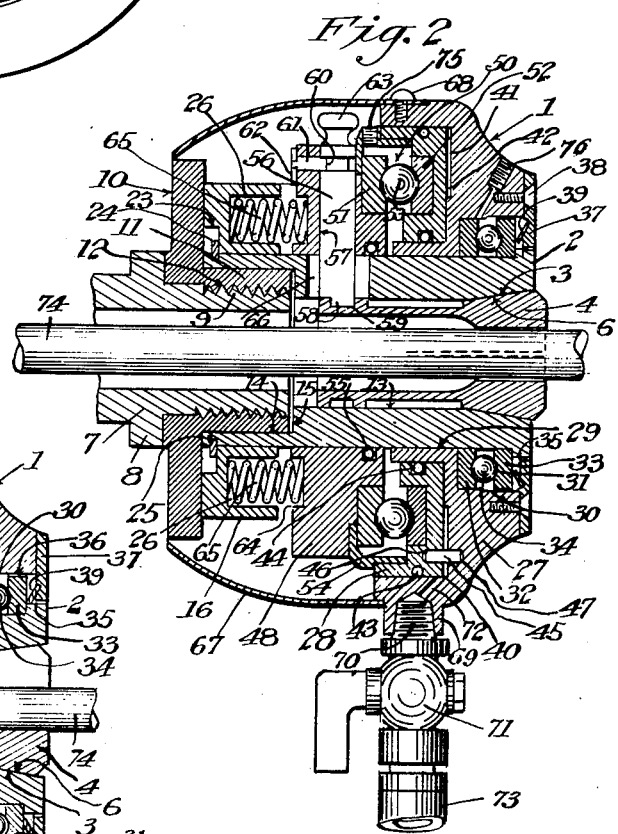
INVENTOR:
DONALD STARK DE MUNCK
BY
*Calvin Brown*
ATTORNEY.

Patented Apr. 18, 1950

2,504,186

UNITED STATES PATENT OFFICE 2,504,186

CHUCK

Donald Stark De Munck, Burbank, Calif.

Application November 28, 1945, Serial No. 631,346

3 Claims. (Cl. 279—4)

The present invention relates to chucks and specifically to a type of collet chuck which is hydraulically operated.

An object of the invention is the provision of a collet chuck which may be attached to such devices as tool room lathes, bench lathes, turret lathes and the like, for progressively controlling the feeding and clamping of the barstock through the spindle of the lathe, and whereby various operations may be performed upon the barstock.

A collet type chuck of the type of the present invention has its parts so arranged and controlled as to permit rapid and accurate work upon barstock, in that a barstock may be fed through the lathe spindle and chuck, clamped tightly during a work operation and quickly released for further movement of the barstock. The average chuck requires several manual operations by the operator, such as releasing the collet, moving the work and tightening the collet, between which operations rotation of the lathe spindle in some cases is stopped.

So far as the inventor is aware, there is no hydraulically controlled collet type chuck now on the market which is positive in its operation. The inventor is aware that attempts have been made to provide a hydraulic means for closing a collet, but such devices do not hold a pressure, with the result that the collet becomes loose and the work is not firmly held.

An object of the present invention is to provide a collet type chuck which clamps the barstock positively through all work operations thereon, instantly releases the barstock as desired, and again clamps it tightly and under controlled pressure.

Other objects include a collet chuck which is simple of construction, of few parts, easily assembled, leakproof and economical in cost of manufacture.

With the above mentioned and other objects in view, the invention consists in the novel and useful provision, formation, construction, association and relative arrangement of parts, members and features, all as shown in one embodiment in the accompanying drawing, described generally and more particularly pointed out in the claims.

In the drawing:

Fig. 1 is a front elevation of the collet chuck, looking in the direction of the tapered end of the collet;

Fig. 2 is a transverse sectional view on the line 2—2 of Fig. 1 and showing in addition, a connection adapted to lead to a source of fluid under presure; and Fig. 3 is a fragmentary sectional view on the line 3—3 of Fig. 1.

Referring now to the drawing:

The collet chuck is designated as an entirety by the numeral 1, and the same includes a collet body 2, which is substantially annular in form and provided with a tapered seat 3. Within the body is positioned the collet 4. The collet comprises a sleeve which is split longitudinally to provide two or more jaws, as shown in Fig. 1, at 5. The external surface of the jaw portion of the collet is tapered at 6 to cooperate with tapered seat 3, so that movement of the collet inwardly of the collet body 2 will close the jaws, and outward movement will release the jaws. The device is adapted to operate in one embodiment in conjunction with a hollow spindle 7. This spindle is flanged at 8, and screwthreaded at 9 to receive an adapter plate 10, the said adapter plate being substantially an annulus and provided with an annular flange 11 formed with internal screwthreads 12, thus constituting a fitting to be secured on the threads 9 of the spindle. The collet body 2 has two portions of different diameter, as illustrated at 13 and 14; this construction provides a shoulder at 15. The larger diameter portion 14 surrounds the flange 11. The collet body 2 is adapted to be secured to the adapter plate. To accomplish this, I have provided an annulus or ring 16 which surrounds the periphery of the collet body adjacent the adapter plate 10. The ring is provided with one or more transverse screwthreaded bores 17 and 18, adapted to accommodate screws designated generally as 19. The screw 19 in the threaded bore 17 passes through a transverse opening 20 in the collet body, and is received in a bore 21 of flange 11. The screw 19 for bore 18 is passed through a tranverse bore 22 in adapter plate 10. Thus the adapter plate is secured to the ring 16 and the ring in turn is secured to the collet body and to the flange of the adapter plate, all of which holds the parts in a definite fixed relationship. The ring 16 is recessed at 23, to receive a snap ring 24 positioned in an annular groove 25 of the collet body. The snap ring acts as a means for holding the ring 16 in position upon the collet body. Ring 16 is provided with one or more transverse sockets 26, the purpose of which is hereinafter detailed.

The invention contemplates the provision of a cylinder and a piston to be moved relative to the cylinder for controlling movement of the collet relative to the collet body. The cylinder is shown at 27 and the piston at 28. The cylinder 27 is formed with a central bore 29, and with a counterbore 30. The collet body is passed through the bore 29. The counterbore portion carries bearing means 31, comprising a pair of race members 32 and 33 between which are positioned balls or rollers 34. The collet body is formed with an external flange at 35 to provide a shoulder in engagement with the race 33. The periphery of the race 33 is spaced from the wall bounding the counterbore 30, as indicated at 36 in Fig. 3.

Surrounding the flange 35 is a ring 37 held to the cylinder in any approved manner, such as by screws 38; the inner face of said ring carries a felt ring 39, the two rings 37 and 39 functioning as a dust stop for the bearing means 31, and also functioning to prevent small metal shavings or oil from entering between the bearings.

The cylinder 27 is formed with an annular groove 40, the head wall of which is stepped at 41. The piston 28 is confined within the annular groove, and the stepped portion provides an annular space 42 between the head of the piston and the head wall of the cylinder. The piston carries ring-type packing means 43 and 44 for engagement with the walls bounding the annular groove 40, to provide a pressure seal. Axial rotation does not occur between the cylinder and the piston due to the presence of one or more pins 45 confined in aligned transverse bores 46 and 47 in the piston and cylinder respectively.

A ring 48 is carried on the periphery of the collet body 2; this ring is annularly stepped at 49. Bearing means designated generally as 50 is positioned between the piston and the ring 48, the said bearing means including a race 51, positioned on the step 49, a race 52 confined within the piston, and balls or rollers 53 positioned between the races. For maintaining the bearing means clear of dirt, metal shavings, oil and the like, a seal 54 is provided between the piston 28 and ring 48. A seal ring 55 lies between the ring 48 and the periphery of the collet body 2.

A pin 56 is passed through radial bore 57 in the ring 48. One end of said pin is provided with a key 58 adapted to be received within an annular groove 59 formed on the collet 4. The upper end of pin 56 is annularly grooved at 60, the groove adapted to receive a pin 61 passed through a transverse bore in the ring 48 and held in position by means of a snap ring 62. The pin is provided with a head 63 so that the pin may be quickly removed to facilitate changing the collet to a different size for different diameter of stock, or to a different shape. Inasmuch as the ring 48 may carry one or more of the pins 56, the said ring is hereinafter termed a pin retainer ring. The pin retainer ring 48 is provided on one surface with socket portions 64, and confined between sockets 64 and the sockets 26 of ring 16 are coil springs 65. The coil springs normally urge the pin retainer ring 48 in one direction. It will be observed on reference to Fig. 2 that the collet body 2 is provided with an enlarged transverse bore at 66, and that the key 58 is passed through said bore. The enlarged transverse bore 66 allows movement of the key within the confines of the collet body.

A cover 67 is secured by means 68 to the cylinder, and extends over and adjacent to the perimeter of the adapter plate 10.

The cylinder is provided with a fitting 69, which fitting receives a threaded nipple 70 of a three-way valve 71. A port 72 permits communication between the nipple and the annular groove 40. The valve 71 is secured to tubing or the like 73, which leads to air or other fluid under pressure.

The operation, uses and advantages of the invention just described are as follows:

The collet chuck 1 is adapted to be secured to the spindle 7. The barstock 74 is passed through the spindle and between the jaws of the collet 4. The barstock is held by the collet to the end that certain operations, as indicated, may be performed on that portion of the barstock which extends beyond the collet. Certain automatic machinery may operate upon the barstock, and as soon as a device is formed the barstock has movement outwardly through the collet and thereafter is clamped by the collet so that further operation may proceed thereon. A device of the type described permits the barstock to be held securely against movement when the stock is operated upon and regardless of the length of time of said operation. Referring to Fig. 2, the barstock is shown as capable of free movement through the collet. When the valve 71 is opened, air or other fluid under pressure will pass through port 72 into the annular groove 40, thereby exerting a pressure between the cylinder and the piston and moving the piston away from the cylinder, as shown in Fig. 3. This movement will bring the collet into clamping engagement with the barstock and hold the barstock securely. The piston through the bearing means 50 transmits movement to the pin retainer ring 48, and the pin 56 carried by this ring moves the collet, due to the key 58 engaging said collet in the annular groove 59. Such movement acts to compress springs 65. When the valve 71 is moved to a second position, air under pressure is shut off and the air bled between the cylinder and piston, and the springs expand to force ring 48 and the piston in the opposite direction to release the collet from the conical seat 3 of the collet body.

In a device of this character the spindle 7 is of course rotated, and rotation of the spindle will cause certain portions of the collet chuck to rotate. However, the cylinder and piston do not rotate, while all other parts not connected therewith are capable of rotation. By way of example, the collet 4, collet body 2, the pin retainer ring 48, ring 16 and adapter plate 10 all rotate as the spindle is rotated. No rotation is transmitted to the cylinder and piston due to the bearing means 31 and 50. In respect to bearing means 31, the race 32 does not rotate, while race 33 rotates with the collet body 2, any pressure between the races being communicated by the balls 34. It is to be observed that the race 33 is spaced at 36 from the cylinder. In the case of the bearing means 50, race 52 does not rotate, while race 51 does rotate and pressure is communicated between the said races by the balls 53. Pressure losses do not occur between the piston and the cylinder due to the presence of the packing means 43 and 44. I may provide means whereby the moving parts may be lubricated, which means is indicated at 75 and 76.

I claim:

1. The combination with a spindle of an annular collet body, means for securing the collet body on said spindle and a collet for movement within said body to open and close the same about work, a ring supported by said collet body, a key between said ring and the collet, a cylinder, a piston within said cylinder and separate bearing means between the cylinder and the said ring and between the cylinder and collet body, said cylinder and said piston, and means for directing a fluid under pressure therebetween to move the piston in one direction and in turn transmit movement of the ring to said collet through said key.

2. In combination, an adapter plate for screw-threaded engagement with a spindle, an annular collet body supported by said adapter plate, a collet for movement within said collet body to release or clamp the collet about work passed through the spindle and said collet, a pin retainer ring carried on the periphery of said collet body, a pin passed through said pin retainer ring and engaging said collet, whereby movement of the ring produces longitudinal movement of the collet within the collet body, and resilient means between the adapter plate and said pin retainer ring for urging the ring in one direction to open the collet; an annular member carried on the periphery of the collet body, said annular member formed with an annular groove, providing a cylinder, an annular piston within said cylinder and bearings between the piston and the pin retainer ring whereby when fluid under pressure is admitted between the piston and the cylinder, said pin retainer ring is moved in one direction.

3. In combination, an adaptor plate for screw threaded engagement with a spindle, an annular collet body supported by said adaptor plate, a collet for movement within said collet body to release or clamp the collet about work passed through the spindle in said collet, a pin retainer ring carried on the periphery of said collet body, a pin passed through said pin retainer ring and engaging said collet, whereby movement of the ring produces longitudinal movement of the collet body, an annular member carried on the periphery of the collet body, bearing means between the annular member on the collet body whereby rotation of the collet body produces no rotation in the annular member, said annular member formed with an annular groove, providing a cylinder, an annular piston within said cylinder and bearings between the piston and the pin retainer ring whereby when fluid under pressure is admitted between the piston and the cylinder, said pin retainer ring is moved in one direction.

DONALD STARK DE MUNCK.

REFERENCES CITED

The following references are of record in the file of this patent:

UNITED STATES PATENTS

| Number | Name | Date |
| --- | --- | --- |
| 1,613,090 | Fornaca | Jan. 4, 1927 |
| 2,279,730 | Bradley | Apr. 14, 1942 |
| 2,345,069 | Phillips | Mar. 28, 1944 |
| 2,383,094 | Walder | Aug. 21, 1945 |
| 2,393,458 | Cook | Jan. 22, 1946 |

FOREIGN PATENTS

| Number | Country | Date |
| --- | --- | --- |
| 391,295 | Great Britain | Apr. 27, 1933 |